United States Patent [19]

Kawai et al.

[11] Patent Number: 5,068,067

[45] Date of Patent: Nov. 26, 1991

[54] EMULSIFIER FOR MICROCAPSULES, MICROCAPSULES USING SAID EMULSIFIER AND PROCESS FOR PRODUCING SUCH MICROCAPSULES, AND NON-CARBON PRESSURE-SENSITIVE COPYING PAPER USING SAID MICROCAPSULES

[75] Inventors: Akira Kawai; Yoshihide Murakami, both of Takasago, Japan

[73] Assignee: Mitsubishi Paper Mills Limited, Tokyo, Japan

[21] Appl. No.: 423,188

[22] Filed: Oct. 18, 1989

[30] Foreign Application Priority Data

| Oct. 17, 1988 | [JP] | Japan | 63-262148 |
| Oct. 18, 1988 | [JP] | Japan | 63-263745 |
| May 15, 1989 | [JP] | Japan | 1-121314 |
| May 15, 1989 | [JP] | Japan | 1-121315 |
| May 15, 1989 | [JP] | Japan | 1-121316 |

[51] Int. Cl.⁵ ............................. B01J 13/18
[52] U.S. Cl. ...................... 264/4.7; 428/402.21; 430/138; 252/358
[58] Field of Search .................. 264/4.7; 428/402.21

[56] References Cited

U.S. PATENT DOCUMENTS

| 4,089,802 | 5/1978 | Foris et al. | 264/4.7 X |
| 4,328,119 | 4/1982 | Iwasaki et al. | 264/4.7 |
| 4,533,599 | 8/1985 | Okumura et al. | 264/4.7 X |
| 4,601,863 | 7/1986 | Shioi et al. | 264/4.7 X |
| 4,711,749 | 12/1987 | Kosaka et al. | 264/4.7 |
| 4,753,968 | 6/1988 | Shioi et al. | 264/4.7 X |
| 4,935,172 | 6/1990 | Ishiguro et al. | 264/4.7 |

OTHER PUBLICATIONS

Patent Abstracts of Japan, vol. 6, No. 213 (C–135) [1109], Nov. 17, 1982; JP–A–57 135,038 (Kanzaki Scishi K.K.).

*Primary Examiner*—Richard D. Lovering
*Assistant Examiner*—John M. Covert
*Attorney, Agent, or Firm*—Cushman, Darby & Cushman

[57] ABSTRACT

Disclosed in this invention are an emulsifier for producing microcapsules, containing as active principle a water-soluble polymer the emulsifier being composed of benzyl (meth)acrylate and/or diisobutylene, styrene and maleic anhydride, microcapsules using the emulsifier, a process for producing the microcapsules, and a non-carbon pressure-sensitive copying paper using the microcapsules.

6 Claims, No Drawings

EMULSIFIER FOR MICROCAPSULES, MICROCAPSULES USING SAID EMULSIFIER AND PROCESS FOR PRODUCING SUCH MICROCAPSULES, AND NON-CARBON PRESSURE-SENSITIVE COPYING PAPER USING SAID MICROCAPSULES

BACKGROUND OF THE INVENTION

1. Field of the Invention

This invention relates to an emulsifier for producing microcapsules, a process for producing microcapsules by using said emulsifier, microcapsules obtained from said process, and non-carbon pressure-sensitive copying paper using said microcapsules.

2. Related Art Statement

Microcapsule is a very fine case made of a thin film and containing a liquid, solid or gaseous body in the form of fine particles measuring one to several hundreds of microns. Microcapsules for various materials such as colorless or color dyes, medicines, agricultural chemicals, perfumes, livestock feed, etc., have been industrially produced and are commercially available.

Use of such microcapsules for pressure-sensitive copying paper is well known. Such pressure-sensitive copying paper comprises an upper sheet of paper having a support coated on its backside with microcapsules containing a hydrophobic liquid having a colorless electron donative dye dissolved therein and a lower sheet of paper having a support coated on its surface side with a colorless electron receptive color-developing agent, said upper and lower sheets being combined so that their respective coated sides face each other. When a printing pressure is applied to the copying paper, said microcapsules are broken to release the contents thereof, causing the color forming agent and color developer contact each other to evoke a chemical reaction whereby a colored substance is formed on the surface of the lower sheet.

In the microcapsules, as described above, a thin film is formed around a substance having certain characteristic properties, so that the characteristic properties of the substance can be also kept confined in the microcapsules when not used, and the substance is taken out by breaking the microcapsules when so desired.

The following methods have been known for producing said type of microcapsules.

(1) Coacervation method using an ion complex of gelatin and anionic protective colloid.
(2) Interfacial polymerization method making use of a film forming reaction at the interface between the inner and outer phases.
(3) In-situ method in which a water-insoluble resin film is formed on the surfaces of oil droplets from the outer phase (aqueous phase) (Japanese Patent Publication No. 2100/85, and Japanese Patent Application Kokai (Laid-Open) Nos. 84881/78, 25277/79, 49984/79, 47139/80, 51238/81 and 177129/84).

These encapsulation methods are capable of forming the microcapsules having a dense film with excellent content holding strength and widely applied in the industries. Nevertheless, it is also a fact that these methods still have various problems in the aspects of production and quality.

For example, the coacervation method has the following problems.

(1) Adjustment of pH, temperature and time of the reaction is troublesome, and the reaction operations are complicated.
(2) As it is difficult to obtain a microcapsule slurry with a concentration higher than 20%, a large amount of moisture must be evaporated away in use for pressure-sensitive copying paper. Thus, there is much room for improvement on working rate, energy cost, etc.,
(3) Because of use of natural material, the film substance is subject to large fluctuation in terms of quality and cost.
(4) The microcapsules produced according to this method can not keep long since they have a tendency to become rotten and condense.

The interfacial polymerization method can alleviate these problems in the coacervation method, but since the film base substances with high reactivity are reacted (at a relatively high temperature), this method is unsuited for encapsulation of the unstable materials or the materials which tend to be denatured thermally. Improvements are also required on solvent and water resistance of the products according to this method.

In the in-situ method, encapsulation of materials with various types of amino resin is proposed, and at present this method is most widely applied in the industries, but it still involves the following problems (1) Since the water-soluble polymeric materials used for emulsifying a hydrophobic liquid into the state of very fine droplet are relatively high in viscosity, the obtained microcapsule dispersion necessarily becomes high in viscosity, so that it is practically difficult to obtain a microcapsule slurry having a good fluidity with a solid content higher than 50%.
(2) In case of using, as emulsifier, a water-soluble polymeric material with low viscosity or a water-soluble polymer reduced in viscosity by diluting it with a suitable solvent, emulsification stability of the hydrophobic liquid is lowered and there takes place particle aggregation or cohesion of the hydrophobic liquid.
(3) In order to obtain a physically and chemically high film strength as well as high stability, it is necessary to apply a high-temperature reaction condition or to use a large amount of film material. Such change of reaction condition is undesirable in case of employing an encapsulation method which is sensitive to variation of conditions, and especially in the industrial production of microcapsules, the risk is high of producing defective or non-conforming products due to a slight error of the setting conditions or an unexpected variation of working conditions. Thus, this method, particularly in the above-said case, is greatly limited in its scope of industrial application.

Also, when the microcapsules obtained according to the known methods are used for non-carbon pressure-sensitive copying paper, the obtained copying paper would prove unsatisfactory in prevention of fouling of formed color by static pressure and in respect of heat resistance.

SUMMARY OF THE INVENTION

The present invention aims at eliminating the problems, such as mentioned above, in the conventional encapsulation methods, and it is especially intended to provide a water-soluble polymeric emulsifier which can be favorably used for the production of microcapsules according to an in-situ method using a hydrophobic liquid as core substance.

The invention is also purposed to provide microcapsules which can have a touch enveloping film by use of a small amount of film forming material, by preparing a microcapsule slurry with high solid concentration and low viscosity by employing an in-situ method.

It is also an object of this invention to provide anoncarbon pressure-sensitive copying paper which is proof against fouling of formed color by static pressure and has high heat resistance, by using the microcapsules obtained according to the improved method of this invention.

DETAILED DESCRIPTION OF PREFERRED EMBODIMENTS

In an aspect of the present invention, there is provided an emulsifier for producing microcapsules, said emulsifier having as active principle a water-soluble polymeric substance which is a copolymer consisting of benzyl (meth)acrylate (A) and/or diisobutylene (B), styrene (C) and maleic anhydride (D), in which preferably the monomer composition of said copolymer comprises 0.1 to 50% by mole of benzyl (meth)acrylate (A) and/or diisobutylene (B) put together, 5 to 59.9% by mole of styrene (C) and 40 to 50% by mole of maleic anhydride (D), the total of (A)+(B)+(C)+(D) being 100% by mole.

More specifically, in an embodiment in said first aspect of the present invention, the monomer composition comprises 0.1 to 2% by mole of benzyl (meth)acrylate, 48 to 59.9% by mole of styrene (C) and 40 to 50% by mole of maleic anhydride (D), the total of (A)+(C)+(D) being 100% by mole. In the second embodiment, the monomer composition comprises 0.1 to 50% by mole of benzyl (meth)acrylate, 5 to 50% by mole of styrene (B) and 40 to 50% by mole of maleic anhydride (D), in which (A)+(C)+(D)=100% by mole. In the third embodiment, the monomer composition comprises 0.1 to 50% by mole of diisobutylene (B), 5 to 59.9% by mole of styrene (C) and 40 to 50% by mole of maleic anhydride (D), the sum of (B)+(C)+(D) being 100% by mole. In the fourth embodiment, the monomer composition comprises 0.1 to 50% by mole of benzyl (meth)acrylate (A) and diisobutylene (B) put together, 5 to 59.9% by mole of styrene (C) and 40 to 50% by mole of maleic anhydride (D), the total of (A), (B), (C) and (D) being 100% by mole.

In another aspect of the present invention, there is provided a process for producing microcapsules characterized by use of a copolymer consisting of benzyl (meth)acrylate (A) and/or diisobutylene (B), styrene (C) and maleic anhydride (D). The process features use of an emulsifier for producing microcapsules comprising said copolymer whose monomer composition preferably comprises 0.1 to 50% by mole of benzyl (meth)acrylate (A) and/or diisobutylene (B), 5 to 59.9% by mole of styrene (C) and 40 to 50% by mole of maleic anhydride (D), the total of (A), (B), (C) and (D) being 100% by mole, and use of an aminoaldehyde condensate as capsule wall film material.

This second aspect of the present invention, too, naturally includes the four embodiments similar to those mentioned above. Since these embodiments are basically the same as those in the first aspect of the invention, they are not restated here.

The method for preparing said copolymer is not specified in the present invention; it is possible to employ various types of known polymerization methods, such as emulsion polymerization, suspension polymerization, solution polymerization, etc., which may be properly selected according to the practical factors involved Preferably, said copolymer is obtained by copolymerizing the monomers, such as mentioned above, in a proper organic solvent such as acetone, methyl ethyl ketone, methyl isobutyl ketone or the like, and then removing the organic solvent. Polymerization initiator is also not defined in the present invention, and various known types are usable. In the case of solution polymerization, it is preferred to use an organic peroxide such as benzoyl peroxide, tertiary butyl peroxybenzoate, tertiary butylperoxy-2-ethylhexanoate, etc., or an organic azo compound such as azobisisobutyronitrile, dimethyl-2,2'-azobisisobutyrate, etc. In use of the thus prepared copolymer as an emulsifier for producing microcapsules according to this invention, said copolymer is properly neutralized with an appropriate neutralizing agent and diluted by dissolving it in water.

Any change of compositional ratios of monomers within the above-defined ranges presents no problem, but should any one of them get out of the defined range, undesirable phenomena occur relating to the production process of microcapsules and quality of the produced microcapsules.

For instance, when the ratio of maleic anhydride (D) in the monomer composition exceeds 50%, it not only becomes difficult to perform regular copolymerization reaction of the respective monomers, but there also takes place separation of hydrophobic liquid in the course of emulsification and large particles of hydrophobic liquid come to exist in the preparation even if the produced copolymer is used as an aqueous emulsifier solution. On the other hand, when the ratio of maleic anhydride is less than 40%, although the copolymerization reaction proceeds in a relatively favorable way, the product may become insoluble in water or may be increased excessively in viscosity to give an undesirable effect to the emulsification process. Also, when the ratio of styrene is higher than the defined range (or when the ratio of benzyl (meth)acrylate and/or diisobutylene is lower than the defined range), there can not be obtained a tough film such as provided in the present invention, and when the ratio of benzyl (meth)acrylate and/or diisobutylene becomes higher than the defined range, there arises a tendency to increase the viscosity of the water-soluble polymer, giving an adverse effect to the emulsification process or causing formation of defective capsules.

Molecular weight of the water-soluble polymer used in the present invention, as measured by gel permeation chromatograph, is preferably not greater than 1,000,000 calculated in terms of polystyrene molecular weight, and the viscosity of said polymer measured by a B type viscometer is preferably in the range from 20 to 2,000 cps in a 10% aqueous solution of pH 4.0 at 25° C.

The process for producing microcapsules according to the present invention comprises basically the following four steps:
  (1) Step for preparing a water-soluble polymer;
  (2) Step for preparing a core material;
  (3) Step for preparing an aminoaldehyde precondensate; and
  (4) Step for forming an aminoaldehyde resin.

In the step (1) for preparing a water-soluble polymer, the concentration of the water-soluble polymeric solution used for the preparation of said polymer is decided by the viscosity and emulsification stability of the solution, but usually it is preferably in the range of 3 to 15%. The pH of the solution is usually set in an acid region below 7, preferably below 6.

A base such as sodium hydroxide, potassium hydroxide, ammonia, etc., or an acid such as acetic acid, hydrochloric acid, oxalic acid, etc., is used for adjusting pH of the solution.

The core material prepared in step (2) comprises a specific substance such as a dye, medicine, agricultural chemical, liquid crystal, perfume, pigment or the like which is used in a dissolved or dispersed form. Especially when producing microcapsules for pressure-sensitive copying paper, an electron donative color former (organic colorless dye) is used as core material. In this case, as solvent for the core material, there can be used, for example, diallylalkane, alkylnaphthalene, dibenzyl-benzene derivatives, alkylbenzene, paraffin, cycloparaffin, chlorinated paraffin, various types of esters, mineral oils and vegetable oils.

Typical examples of aminoaldehyde resins usable in this invention are urea-formaldehyde resin, melamine-formaldehyde resin, benzoguanamine resin, butylated melamine resin and butylated urea resin. Among them, melamine-formaldehyde resin is especially preferred.

Precondensates of said resins used in step (3) can be easily obtained by reacting the corresponding monomers under the appropriate concentration, pH and temperature conditions. It is possible to use the commercially available preparations.

In the present invention, an aminoaldehyde precondensate and an oil-soluble liquid serving as core material are used in a weight ratio usually in the range of 1 : 3 to 1 : 4. This range, however, is not critical; said weight ratio may be properly changed according to the type of core material used, film material and purpose of use. Also, said precondensate may be substituted by the corresponding monomers per se. Step (3) is not essential in the present invention. It may be omitted depending on the type of starting materials used.

The aminoaldehyde resin forming step (4), namely reaction step, is generally carried out at a temperature in the range of 50° to 90° C., and this resin forming reaction is completed usually in 1 to 3 hours. It is optional to use a catalyst for promoting the resin forming reaction or an agent for disposing of excess formaldehyde after completion of the reaction.

The microcapsule slurry obtained according to the process of this invention can be prepared with a high concentration, and it is also low in viscosity and capable of forming a tough film. Especially when it is used as a slurry of microcapsules for non-carbon paper, it shows excellent coating workability and is capable of high-concentration and high-speed coating.

The non-carbon pressure-sensitive copying paper according to the present invention can be obtained by coating the microcapsules of this invention in which an electron donative color former is contained, a buffering agent and a binder on a substrate. Use of a buffering agent in the present invention is intended to prevent casual break of microcapsules. Usually, wheat starch, potato starch, fine powder of cellulose, synthetic plastic pigment and the like are used as said buffering agent, but the type and amount thereof to be used are not limitative.

As binder, there are usually used a latex, soluble starch, casein, gelatin, gum arabic, polyvinyl alcohol, methyl cellulose and the like either singly or in admixture. It is used for the purpose of fixing the microcapsules and buffering agent on the substrate. The type and amount thereof to be used are not limitative.

As substrate, usually acid paper or neutral paper mainly composed of cellulose fiber is used, but synthetic paper can also be safely used.

EXAMPLES

The present invention will be further described below by showing examples thereof. In the following Examples, all "parts" are by weight unless otherwise noted.

EXAMPLE 1

Preparation of water-soluble polymer 200 g of methyl isobutyl ketone was supplied into a 2-litre flask provided with a reflux condenser, a thermometer, a nitrogen feed pipe and two dropping funnels, and heated to 110°–115° C. Then a monomer solution composed of 103.7 g (0.997 mol) of styrene, 0.525 g (0.003 mol) of benzyl methacrylate, 98 g (1 mol) of maleic anhydride and 200 g of methyl isobutyl ketone and a polymerization initiator solution composed of 2.2 g of tertiary butylperoxybenzoate and 100 g of methyl isobutyl ketone were added dropwise into the flask from the separate dropping funnels respectively over a period of 2 hours while maintaining said temperature. Thereafter, the mixed solution was kept at said temperature for additional two hours. Then, for completing the polymerization, an initiator solution composed of 2.2 g of tertiary butyl peroxy-2-ethylhexanoate and 50 g of methyl isobutyl ketone was added dropwise into the flask over a period of 30 minutes, and the mixture was maintained at said temperature for one hour. The resulting polymerization solution was cooled to a temperature below 100° C. and added with 150 g of water and 75 g (0.9 mol) of sodium hydroxide. Then steam was blown through the reaction mass by an ordinary method to remove methyl isobutyl ketone, and water was added so that the solids concentration would become 8%. There was thus obtained a water-soluble polymer as a solution having the following properties: pH=4.2; B type viscosity (at 25° C.)=300 cps.

Encapsulation

A solution formed by dissolving 3 parts of crystal violet lactone (CVL) in 96 parts of HISOL SAS N-296 (an aromatic solvent produced by Nippon Sekiyu Kagaku KK) was prepared as core material of microcapsule.

200 parts of said hydrophobic liquid was added gradually to 180 parts of the previously obtained water-soluble polymer solution under vigorous stirring, stirring being continued until the volume average particle diameter became 5 microns, thereby obtaining an emulsifier solution.

Separately from the above operations, there was prepared a mixture comprising 11 parts of melamine, 21.2 parts of a 37% formaldehyde solution and 28.2% of water, and the mixture was adjusted to a pH of 9 by adding sodium hydroxide and dissolved by heating to obtain an aqueous solution of melamine-formaldehyde precondensate. This solution was added to said emulsifier solution and the mixed solution was stirred at 70° C. for 2 hours to complete the reaction.

Preparation of non-carbon paper

After confirming formation of microcapsules, the solution was cooled to room temperature and adjusted to a pH 9.0 with a sodium hydroxide solution to perfect encapsulation.

To 100 parts (in terms of solid content) of the thus obtained microcapsule solution were added 30 parts of wheat starch particles and 100 parts of a 10% polyvinyl alcohol solution, and the mixture was coated on a sheet of fine quality paper with a basis weight of 40 g/m$^2$ so that the coating weight after drying would become 5 g/m$^2$. There was thus obtained an upper sheet for non-carbon pressure-sensitive paper (this sheet being hereinafter referred to as CB sheet). This CB sheet was combined with a commercially available lower sheet for no-carbon pressure-sensitive recording paper (lower sheet N-40 for Mitsubishi NCR paper, basis weight: 40 g/m$^2$) and subjected to typewriter printing. The obtained non-carbon paper showed excellent color formation.

EXAMPLE 2

A water-soluble polymer was prepared according to the same process as Example 1 except for use of 101.9 g (0.98 mol) of styrene and 3.5 g (0.02 mol) of benzyl methacrylate.

The obtained water-soluble polymer solution had a solids concentration of 8.0%, a B type viscosity (at 25° C.) of 350 cps and a pH of 4.2.

Encapsulation and preparation of CB sheet were carried out by using this water-soluble polymer solution as emulsifier solution according to the procedure of Example 1.

COMPARATIVE EXAMPLE 1

Preparation of styrene-maleic anhydride copolymer solution

An aqueous solution of styrene-maleic anhydride copolymer was prepared in the same way as Example 1 except for use of 0.312 g (0.003 mol) of styrene in place of 0.525 g (0.003 mol) of benzyl methacrylate. The obtained water-soluble polymer solution had a solids concentration of 8%, a B type viscosity (at 25° C.) of 250 cps and a pH of 4.8.

Encapsulation

Encapsulation and preparation of CB sheet were conducted by using this water-soluble polymer solution as emulsifier solution according to the same process as Example 1 except that the amount of water mixed with melamine and formaldehyde was 130.6 parts (28.2 parts in Example 1).

COMPARATIVE EXAMPLE 2

220 parts of hydrophobic solution prepared in Example 1 was added to 180 parts of an 8.0% aqueous solution of ethylenemaleic anhydride bipolymer (EMA-31 produced by Monsanto Corp., U.S.A.) adjusted to pH 3.5 as water-soluble polymer solution and emulsified in the same way as in Example 1.

Then, 13 parts of melamine, 25.1 parts of a 37% formaldehyde solution and 132 parts of water were mixed, adjusted to pH 9.0 and dissolved by heating to obtain a melamine-formaldehyde precondensate, and the latter was added to the previously prepared emulsifier solution and stirred at 70° C. for 2 hours to complete the reaction.

The resultantly obtained microcapsule slurry was treated according to the same procedure as Example 1 to obtain an upper sheet for non-carbon pressure-sensitive copying paper (CB sheet).

The microcapsules and upper sheets for pressure-sensitive copying paper obtained in the above-described Examples and Comparative Examples were evaluated according to the following criteria.

Solid content

Solids concentration of capsules after 3-hour dry heat treatment at 105° C.

Viscosity

Viscosity of 55% (45% in Comparative Examples) capsule emulsion measured at 25° C. by a B type viscometer.

Blue spots

Capsule emulsion was diluted with water to a solids concentration of 20% and directly coated on the color developer applied side of CF sheet to a coating weight after drying of 6 m/g$^2$, and after drying the coat, the number of spots per 100 cm$^2$ was counted. The greater the number of spots, the worse is the state of encapsulation.

Fouling of formed color by static pressure

CB sheet and CF sheet were placed one on the other so that their respective coated sides faced each other, and after applying thereto a static pressure of 20 kg/cm$^2$ for a period of 30 seconds, reflectance on the CF sheet side was measured. A greater value of reflectance denotes higher strength of microcapsule film.

Heat resistance

CB sheet and CF sheet were placed one on the other so that their respective coated sides faced each other, and after applying a light load of 50 g/cm$^2$ to the combined sheet and leaving it in an atmosphere of 140° C. for 3 hours, reflectance on the CF sheet side was measured. A greater value of reflectance signifies higher heat resistance of the film.

A color difference meter Model ND 101 DP manufactured by Nippon Denshoku Kogyo KK was used for the evaluation of fouling of formed color by static pressure and heat resistance. The evaluation result was shown by value of $$\frac{\text{reflectance of color formed portion}}{\text{reflectance of non-treated (ground) portion}} \times 100 \, (\%)$$

The results of evaluations conducted according to the above-described methods are shown in Table I.

TABLE I

| | Solid content of slurry % | Viscosity cps (20° C.) | Number of blue spots | Fouling of color formation by static pressure | Heat resistance |
|---|---|---|---|---|---|
| Example 1 | 55 | 100 | 1 | 96.0 | 98.0 |
| Example 2 | 54 | 110 | 1 | 97.0 | 97.8 |
| Comp. Example 1 | 45 | 140 | 3 | 93.0 | 95.8 |
| Comp. Example 2 | 45 | 155 | 8 | 90.1 | 94.3 |

EXAMPLE 3

Preparation of water-soluble polymer 200 g of methyl isobutyl ketone was supplied into a 2-litre flask equipped with a reflux condenser, a thermometer, a nitrogen feed pipe and two dropping funnels. After heating said substance in the flask to 110°-115° C., a monomer solution composed of 52 g (0.5 mol) of styrene, 88 g (0.5 mol) of benzyl methacrylate, 98 g (1 mole) of maleic anhydride and 200 g of methyl isobutyl ketone and a polymerization initiator solution composed of 2.2 g of tertiary butyl peroxybenzoate and 100 g of methyl isobutyl ketone were added dropwise into the flask at the same temperature from the separate dropping funnels over a period of 2 hours, and the mixture was maintained at the same temperature for additional 2 hours. Then, for completing the polymerization, an initiator solution composed of 2.2 g of tertiary butyl peroxy-2-ethyl hexanoate and 50 g of methyl isobutyl ketone was added dropwise into the flask over a period of 30 minutes and the mixture was maintained at the same temperature for one hour. The resulting polymerization solution was cooled to a temperature below 100° C. and then added with 150 g of water and 75 g (0.9 mol) of sodium hydroxide, after which steam was blown through the reaction mass in a usual way to remove methyl isobutyl ketone, followed by addition of water to adjust the polymer solution to a final solids concentration of 8%. The resultantly obtained water-soluble polymer solution had a pH of 4.7 and a B type viscosity (at 25° C.) of 70 cps.

Encapsulation

A solution formed by dissolving 3 parts of crystal violet lactone (CVL) in 96 parts of HISOL SAS N-296 (an aromatic solvent produced by Nippon Sekiyu Kagaku kk) was prepared as core material of microcapsule.

200 parts of said hydrophobic liquid was added gradually to 180 parts of the previously obtained water-soluble polymer solution under vigorous stirring. Stirring was continued until the volume average particle diameter became 5 microns, thereby obtaining an emulsifier solution.

Separately from the above operations, 11 parts of melamine, 21.2 parts of a 37% formaldehyde solution and 28.2 parts of water were mixed and the mixture was adjusted to a pH of 9 with sodium hydroxide and then dissolved by heating to obtain an aqueous solution of melamine-formaldehyde precondensate. This was added to said emulsifier solution and stirred at 70° C. for 2 hours to complete the reaction.

After confirming formation of microcapsules, the solution was cooled to room temperature and its pH was raised to 9.0 with a sodium hydroxide solution, which perfected the encapsulation operation.

Preparation of non-carbon paper

To 100 parts (as solid content) of the thus obtained microcapsule solution were added 30 parts of wheat starch particles and 100 parts of a 10% polyvinyl alcohol aqueous solution, and the mixture was coated on a sheet of fine quality paper (40 g/m$^2$ in basis weight) to a coating weight after drying of 5 g/m$^2$ to obtain an upper sheet for non-carbon pressure-sensitive recording paper (CB sheet). This CB sheet was combined with a lower sheet for non-carbon pressure-sensitive recording paper (a lower sheet N-40 for Mitsubishi NCR paper, basis weight: 40 g/m$^2$). The obtained non-carbon recording paper showed excellent color formation in typewriter printing.

EXAMPLE 4

A water-soluble polymer was prepared in the same way as Example 3 except that the amount of styrene and benzyl methacrylate added were changed to 20.8 g (0.2 mol) and 140.8 g (0.8 mol), respectively.

The obtained water-soluble polymer solution had the following properties: solids concentration=7.5%; B type viscosity (at 25° C.)=120 cps; pH=5.0.

Encapsulation and preparation of CB sheet were carried out by using this water-soluble polymer as emulsifier solution according to the process of Example 3.

EXAMPLE 5

A water-soluble polymer was prepared in the same way as Example 3 except that styrene was added in an amount of 80 g (0.77 mol) and benzyl methacrylate in an amount of 105.6 g (0.60 mol).

The obtained product had a solids concentration of 8.0%, a B type viscosity (at 25° C.) of 70 cps and a pH of 4.8.

By using this water-soluble polymer as emulsifier solution, there were conducted encapsulation and preparation of CB sheet according to the process of Example 3.

EXAMPLE 6

42 parts of an aqueous solution having 14 parts of urea dissolved therein and 29 parts of a 37% formaldehyde solution were added to the emulsifier solution obtained in Example 3, and the mixture was stirred at 60° C. for 2 hours to complete the reaction.

After confirming formation of microcapsules, the solution was cooled to room temperature and its pH was raised to 9.0 with an aqueous sodium hydroxide solution, thereby perfecting the encapsulation operation. Also, a CB sheet was prepared according to the process of Example 3.

The microcapsules and upper sheets for pressure-sensitive copying paper obtained in the above Examples (3-6) were evaluated regarding their proofness against fouling in color formation by static pressure and heat resistance by means of solid content, viscosity and blue spots in the same way as described before.

The results are shown in Table II.

TABLE II

|           | Solid content of slurry % | Viscosity cps (20° C.) | Number of blue spots | Fouling in color formation by static pressure | Heat resistance |
|-----------|---------------------------|------------------------|----------------------|-----------------------------------------------|-----------------|
| Example 3 | 55                        | 90                     | 1                    | 97.0                                          | 98.0            |
| Example 4 | 54                        | 110                    | 1                    | 95.0                                          | 97.8            |
| Example 5 | 55                        | 100                    | 2                    | 94.5                                          | 96.5            |
| Example 6 | 55                        | 80                     | 1                    | 94.7                                          | 97.3            |

EXAMPLE 7

Preparation of water-soluble polymer 200 g of methyl isobutyl ketone was supplied into a 2-litre flask provided with a reflux condenser, a thermometer, a nitrogen feed pipe and two dropping funnels. After heating said substance in the flask to 110° to 115° C., a monomer solution composed of 52 g (0.5 mol) of styrene, 73.7 g (0.5 mol as 2,4,4'-trimethylpentene-1) of diisobutylene (containing 76% by weight of 2,4,4'-trimethylpentene-1), 98 g (1 mol) of maleic anhydride and 200 g of methyl isobutyl ketone and a polymerization initiator solution composed of 2.2 g of tertiary butyl peroxybenzoate and 100 g of methyl isobutyl ketone were added dropwise into the flask at the same temperature from the separate dropping funnels over a period of 2 hours. Then the mixture was maintained at the same temperature for additional two hours. Thereafter, for completing the polymerization, an initiator solution comprising 2.2 g of tertiary butyl peroxy-2-ethylhexanoate and 50 g of methyl isobutyl ketone was added dropwise into the flask over a period of 30 minutes, and then the mixture was kept at the same temperature for one hour. The resulting polymerization solution was cooled to a temperature below 100° C. and added with 150 g of water and 75 g (0.9 mol) of 48% sodium hydroxide. Then steam was blown through the reaction mass to eliminate methyl isobutyl ketone and water was added to adjust the solution to a final solids concentration of 8%. The thus obtained water-soluble polymer solution had the following properties: pH=4.7; B type viscosity (at 25° C.)=60 cps.

Encapsulation

A solution prepared by dissolving 3 parts of crystal violet lactone (CVL) in 96 parts of HISOL SAS N-296 (an aromatic solvent produced by Nippon Sekiyu Kagaku KK) was used as core material of microcapsule.

220 parts of said hydrophobic liquid was added gradually to 180 parts of the previously prepared water-soluble polymer solution under vigorous stirring and stirring was continued until the volume average particle diameter became 5 microns, thereby obtaining an emulsifier solution.

Separately from the above operation, there was prepared a mixture comprising 11 parts of melamine, 21.2 parts of a 37% formaldehyde solution and 28.2 parts of water, and this mixture was adjusted to pH 9 with sodium hydroxide and dissolved by heating to obtain an aqueous solution of melamine-formaldehyde precondensate. This precondensate was added into said emulsifier solution and the mixed solution was stirred at 70° C. for 2 hours to complete the reaction.

After confirming formation of microcapsules, the solution was cooled to room temperature and its pH was raised to 9.0 with a sodium hydroxide solution to perfect the encapsulation operation.

Preparation of non-carbon paper

To 100 parts (as solid matter) of the thus obtained microcapsule solution were added 30 parts of wheat starch particles and 100 parts of a 10% polyvinyl alcohol solution, and the mixture was coated on a sheet of fine quality paper (40 g/m$^2$ in basis weight) to a final coating weight of 5 g/m$^2$ to obtain an upper sheet for non-carbon pressure-sensitive recording paper (CB sheet). This CB sheet was combined with a commercially available lower sheet for non-carbon pressure-sensitive recording paper (lower sheet N-40 for Mitsubishi NCR paper, basis weight: 40 g/m$^2$). When the obtained non-carbon recording paper was typewriter printed, it showed excellent color formation.

EXAMPLE 8

A water-soluble polymer was prepared in the same way as Example 7 except for use of 20.8 g of styrene and 117.9 g (0.8 mol as 2,4,4'-trimethylpentene-1) of diisobutylene (containing 76% by weight of 2,4,4'-trimethylpentene-1).

The obtained water-soluble polymer solution had a solids concentration of 7.5%, a B type viscosity (at 25° C.) of 150 cps and a pH of 5.0.

Encapsulation and preparation of CB sheet were conducted by using this polymer solution as emulsifier solution in accordance with the process of Example 7.

EXAMPLE 9

A water-soluble polymer was obtained in the same way as Example 7 except for use of 80 g (0.77 mol) of styrene and 88.4 g (0.6 mol as 2,4,4'-trimethylpentene1) of diisobutylene (containing 76% by weight of 2,4,4'-trimethylpentene-1).

This water-soluble polymer solution had the following properties: solids concentration=8.0%; B type viscosity (at 25° C.)=105 cps; pH=4.6.

Encapsulation and preparation of CB sheet were carried out by using this water-soluble polymer solution as emulsifier solution according to the methods of Example 7.

EXAMPLE 10

42 parts of an aqueous solution having 14 parts of urea dissolved therein and 29 parts of a 37% formaldehyde solution were added to the emulsifier solution prepared in Example 7, and the mixed solution was stirred at 60° C. for 2 hours to effectuate the reaction.

After confirming formation of microcapsules, the solution was cooled to room temperature and its pH was raised to 9.0 with a sodium hydroxide solution to perfect encapsulation. Also, CB sheet was prepared in the same manner as Example 7.

EXAMPLE 11

A water-soluble polymer was prepared according to the same procedure as Example 7 except for use of 103.7 g (0.997 mol) of styrene and 0.442 g (0.003 mol as 2,4,4'-trimethylpentene-1) of diisobutylene (containing 76% by weight of 2,4,4'-trimethylpentene-1).

The obtained water-soluble polymer solution had the following properties: solids concentration=8.0%; B type viscosity (at 25° C.)=350 cps; pH=4.2.

Encapsulation and preparation of CB sheet were conducted by using this water-soluble polymer solution as emulsifier solution according to the process of Example 7. When typewriter printing was conducted on the obtained CB sheet, it showed as excellent color formation as in Example 7.

EXAMPLE 12

A water-soluble polymer was prepared in the same way as Example 7 except for use of 101.9 g (0.98 mol) of styrene and 2.95 g (0.02 mol as 2,4,4'-trimethylpentene-1) of diisobutylene (containing 76% by weight of 2,4,4'-trimethylpentene-1).

The obtained water-soluble polymer solution had a solids concentration of 8.0%, a B type viscosity (at 25° C.) of 410 cps and a pH of 4.2.

Encapsulation and preparation of CB sheet were performed by using this water-soluble polymer solution as emulsifier solution according to the process of Example 7.

The microcapsules and upper sheets for pressure-sensitive copying paper obtained in the above Examples were evaluated by the methods described before, the results being shown in Table III.

TABLE III

|  | Solid content capsule % | Liquid viscosity of capsule cps (25° C.) | Number of blue spots | Fouling of color formation by static pressure | Heat resistance |
|---|---|---|---|---|---|
| Example 7 | 55 | 85 | 1 | 96.5 | 98.8 |
| Example 8 | 54 | 135 | 1 | 94.8 | 98.0 |
| Example 9 | 55 | 90 | 2 | 95.5 | 97.2 |
| Example 10 | 55 | 70 | 1 | 94.6 | 97.2 |
| Example 11 | 55 | 85 | 1 | 96.5 | 98.8 |
| Example 12 | 54 | 135 | 1 | 96.5 | 98.0 |

EXAMPLE 13

Preparation of water-soluble polymer 200 g of methyl isobutyl ketone was supplied into a 2-litre flask equipped with a reflux condenser, a thermometer, a nitrogen feed pipe and two dropping funnels. After heating said substance in the flask to 110°-115° C., a monomer solution comprising 52 g (0.5 mol) of styrene, 44 g (0.25 mol) of benzyl methacrylate, 36.9 g (0.25 mol as 2,4,4-trimethylpentene-1) of diisobutylene (containing 76% by weight of 2,4,4-trimethylpentene-1), 98 g (1 mol) of maleic anhydride and 200 g of methyl isobutyl ketone and a polymerization initiator solution comprising 2.2 g of tertiary butyl peroxybenzoate and 100 g of methyl isobutyl ketone were added dropwise into the flask at the same temperature from the respective dropping funnels over a period of 2 hours. The mixture was maintained at said temperature for additional two hours. Then, for completing the polymerization, an initiator solution comprising 2.2 g of tertiary butyl peroxy-2-ethylhexanoate and 50 g of methyl isobutyl ketone was added dropwise into the flask over a period of 30 minutes, and then the mixture was maintained at said temperature for one hour. The polymerization solution was cooled to a temperature below 100° C. and added with 150 g of water and 75 g (0.9 mol) of 48% sodium hydroxide. Then steam was blown through the reaction mass by a conventional method to remove methyl isobutyl ketone and water was added to adjust the solids concentration of the solution to 8%. The thus obtained water-soluble polymer solution had a pH of 4.7 and a B type viscosity (at 25° C.) of 70 cps.

Encapsulation

A solution formed by dissolving 3 parts of crystal violet lactone (CVL) in 96 parts of HISOL SAS N-296 (an aromatic solvent produced by Nippon Sekiyu Kagaku KK) was prepared as core material of microcapsule.

220 parts of said hydrophobic liquid was added gradually to 180 parts of the previously prepared water-soluble polymer solution under vigorous stirring and stirring was continued until the volume average particle diameter of the mixed solution became 5 microns, thereby obtaining an emulsifier solution.

Separately from the above operation, 11 parts of melamine, 21.2 parts of a 37% formaldehyde solution and 28.2 parts of water were mixed and the mixture was adjusted to pH 9 with sodium hydroxide and dissolved by heating to obtain an aqueous solution of melamine-formaldehyde precondensate. This was added to said emulsifier solution and the mixture was stirred at 70° C. for 2 hours to effectuate the reaction.

After conforming formation of microcapsules, the solution was cooled to room temperature and its pH was raised to 9.0 with a sodium hydroxide solution to perfect encapsulation.

Preparation of non-carbon paper

To 100 parts (calculated as solid matter) of the thus obtained microcapsule solution were added 30 parts of wheat starch particles and 100 parts of a 10% polyvinyl alcohol solution, and the mixture was coated on a sheet of fine quality paper (40 g/m² in basis weight) to a final coating weight of 5 g/m² to obtain an upper sheet for non-carbon pressure-sensitive recording paper (CB sheet). This CB sheet was combined with a commercially available lower sheet for non-carbon pressure-sensitive recording paper (lower sheet N-40 for Mitsubishi NCR paper, basis weight: 40 g/m²). The obtained non-carbon paper showed excellent color formation when it was subjected to typewriter printing.

EXAMPLE 14

A water-soluble polymer was prepared in the same way as Example 13 except that styrene was added in an amount of 20.8 g (0.2 mol), benzyl methacrylate in an amount of 70.4 g (0.4 mol) and diisobutylene (containing 76% by weight of 2,4,4-trimethylpentene-1) in an amount of 59.0 g (0.4 mol as 2,4,4-trimethylpentene-1).

The obtained water-soluble polymer solution had a solids concentration of 7.5%, a B type viscosity (at 25° C.) of 120 cps and a pH of 5.0.

Encapsulation and preparation of CB sheet were carried out by using this polymer solution as emulsifier solution according to the process of Example 13.

EXAMPLE 15

A water-soluble polymer was prepared in the same way as Example 13 except that styrene was used in an amount of 80 g (0.77 mol), benzyl methacrylate in an amount of 52.8 g (0.30 mol) and diisobutylene (containing 76% by weight of 2,4,4-trimethylpentene-1) in an amount of 14.7 g (0.1 mole as 2,4,4-trimethylpentene-1).

The obtained water-soluble polymer solution had a solids concentration of 8.0%, a B type viscosity (at 25° C.) of 70 cps and a pH of 4.8.

Encapsulation and preparation of CB sheet were carried out by using this aqueous polymer as emulsifier solution according to the process used in Example 13.

EXAMPLE 16

42 parts of an aqueous solution having 14 parts of urea dissolved therein and 29 parts of a 37% formaldehyde solution were added to the emulsifier solution comprising a hydrophobic liquid obtained in Example 13, and the mixture was stirred at 60° C. for 2 hours to perform the reaction.

After confirming formation of microcapsules, the solution was cooled to room temperature and its pH was raised to 9.0 with a sodium hydroxide solution to complete encapsulation. Also, a CB sheet was prepared by following the procedure of Example 13.

The microcapsules and upper sheets for pressure-sensitive copying paper obtained in the above Examples were evaluated by the described methods, the results being shown in Table IV.

TABLE IV

|  | Solid content of slurry % | Viscosity cps (20° C.) | Number of blue spots | Fouling of color formation by static pressure | Heat resistance |
|---|---|---|---|---|---|
| Example 13 | 55 | 90 | 1 | 97.0 | 98.0 |
| Example 14 | 54 | 110 | 1 | 95.0 | 97.8 |
| Example 15 | 55 | 100 | 2 | 94.5 | 96.5 |
| Example 16 | 55 | 80 | 1 | 94.7 | 97.3 |

As the results of the examples testify, it is possible with the present invention to obtain high-strength microcapsules, which are low in viscosity and high in solid content, by using a small amount of film material.

The process of this invention finds particularly favorable application to production of pressure-sensitive copying paper having excellent coating performance because of low viscosity and also having good color forming quality and high stain resistance.

Another noticeable effect of the present invention is reduction of emulsification time, that is, marked reduction of the time required for uniformalizing particle size of hydrophobic liquid in comparison with the conventional methods.

What is claimed is:

1. A process for producing microcapsules which comprises the steps of
   (1) combining in an aqueous medium an aminoaldehyde polycondensate as wall film material and a water-soluble high polymeric substance which is a copolymer selected from the group consisting of:
      (a) benzyl (meth) acrylate (A), styrene (C), maleic anhydride (D);
      (b) diisobutylene (B), styrene (C), maleic anhydride (D); and
      (c) benzyl (meth)acrylate (A), diisobutylene (B), styrene (C), maleic anhydride (D) to obtain an emulsion of desired average particle size;
   (2) adding an amino-aldehyde pre-condensate to the emulsion to form a mixture; and
   (3) heating the mixture to form microcapsules.

2. The process according to claim 1, wherein the content of at least one of benzyl (meth)acrylate (A) and diisobutylene (B) in the copolymer is 0.1 to 50% by mole, the content of styrene (C) is 5 to 59.9% by mole and the content of maleic anhydride (D) is 40 to 50% by mole, the total of (A)+(B)+(C)+(D) being 100% by mole.

3. The process according to claim 1, wherein the content of benzyl (meth)acrylate (A) in the copolymer is 0.1 to 2% by mole, the content of styrene (C) is 48 to 59.9% by mole and the content of maleic anhydride (D) is 40 to 50% by mole, the total of (A)+(C)+(D) being 100% by mole.

4. The process according to claim 1, wherein the content of benzyl (meth)acrylate (A) in the copolymer is 2 to 50% by mole, the content of styrene (C) is 5 to 50% by mole and the content of maleic anhydride (D) is 40 to 50% by mole, the total of (A)+(C)+(D) being 100% by mole.

5. The process according to claim 1, wherein the content of diisobutylene (B) in the copolymer is 0.1 to 50% by mole, the content of styrene (C) is 5 to 59.9% by mole and the content of maleic anhydride (D) is 40 to 50% by mole, the total of (B)+(C)+(D) being 100% by mole.

6. The process according to claim 1, wherein the content of benzyl (meth)acrylate (A) and diisobutylene (B) put together is 0.1 to 50% by mole, the content of styrene (C) is 5 to 59.9% by mole and the content of maleic anhydride (D) is 40 to 50% by mole, the total of (A)+(B)+(C)+(D) being 100% by mole.

* * * * *